United States Patent [19]

Rommel

[11] Patent Number: 4,615,111

[45] Date of Patent: Oct. 7, 1986

[54] WIRING TOOL FOR WIRING ELECTRIC, MULTIPIN PLUG CONNECTORS, CONNECTOR STRIPS OR THE LIKE, USING CLAMPING CUTTER TECHNIQUES

[76] Inventor: Reiner Rommel, Moldaustr. 6, 3570 Stadtallendorf, Fed. Rep. of Germany

[21] Appl. No.: 661,422

[22] Filed: Oct. 16, 1984

[30] Foreign Application Priority Data

Oct. 26, 1983 [DE] Fed. Rep. of Germany ....... 3338816

[51] Int. Cl.4 ........................... B23P 19/0; B25B 7/12

[52] U.S. Cl. ........................................ 29/749; 29/750; 29/758; 81/352; 81/373

[58] Field of Search ................. 29/749, 750, 751, 758; 81/352, 373; 100/291

[56] References Cited

U.S. PATENT DOCUMENTS 804,295 11/1905 Zacharias .......................... 81/352 X
3,021,738 2/1962 Anderson et al. ...................... 81/15
3,898,724 8/1975 Conorich .......................... 29/749 X
4,070,754 1/1978 Baurkemper .......................... 29/749
4,295,254 10/1981 Adams et al. ........................... 29/33

*Primary Examiner*—Mark Rosenbaum
*Assistant Examiner*—R. S. Wallace
*Attorney, Agent, or Firm*—Thomas & Kennedy

[57] ABSTRACT

The invention relates to a wiring tool for wiring electric, multipin plug connectors, connector strips or the like, using clamping cutter techniques, comprising a support for the binder receiving the lines to be connected and an opposed support for the binder, the support being adapted to be displaced with respect to the opposed support parallel to itself and towards the opposed support, the support being supported in its mounting, in accordance with the invention, on at least one wedge adapted to be linearly displaced by means of a pushrod.

3 Claims, 7 Drawing Figures

WIRING TOOL FOR WIRING ELECTRIC, MULTIPIN PLUG CONNECTORS, CONNECTOR STRIPS OR THE LIKE, USING CLAMPING CUTTER TECHNIQUES

BACKGROUND OF THE INVENTION

The invention relates to a wiring tool for wiring electric, multipin plug connectors, connector strips or the like, using clamping cutter techniques, as described, for example, in the DIN sheet DIN 41 611, Part 6 and, on the other hand, also from the subject-matter of German Offenlegungsschrift No. 3,137,209 or of U.S. Pat. No. 4,286,381. Such tools are provided with an actuating device having a pistol grip by means of which a pushrod is moved which presses the respective conductor into a cutting clamp provided in the binder. Such tools have the defect that they are suitable only for single wiring and cannot be used for ribbon cables.

On the other hand, wiring tools are also known to exist for ribbon cables in which tools a two-part binder is used and a support with an opposed support is provided, the support being adapted to be displaced with respect to the opposed support parallel to itself and to the opposed support. Such tools have the disadvantage that they are unsuitable for applying greater deformation forces, despite their complicated construction, and may not be used for processing wider ribbon cables.

SUMMARY OF THE INVENTION

The invention has the object of remedying these defects and providing a tool which, whilst being of simplest construction, permits electric, multipin plug connectors, connector strips, ribbon cables or the like to be wired by clamping cutter techniques without difficulty and applying only little actuating forces.

According to the invention, this object is achieved by the fact that the support is supported in its mounting on at least one wedge which is adapted to be linearly displaced by means of a pushrod device.

Support and opposed support are particularly advantageously accommodated in an interchangeable head which forms the mounting and which is adapted to be attached to an actuating device provided with a pistol grip and which on its inside accommodates the wedge, adapted to be linearly displaced by means of the pushrod of the actuating device, and guide elements for the transverse displacement of the support. In this arrangement, the interchangeable head is provided with tie bars which are parallel to each other and form a "U" and between which both the support for the binder and, lying above the latter, the opposed support are disposed.

The support is advantageously guided so as to be displaceable transversely towards the opposed support in the mounting accommodating the push wedge, whilst the push wedge is provided with at least two wedge faces which slope in the same direction and on which the support is supported by means of rollers, counter-wedges or the like.

In order to match the tool to the various dimensions or shapes of the binders and ribbon cables, the tie bars are detachably connected to the opposed support via exchangeable linchpins, and holes, sockets and the like are provided for the linchpins at various distances from the support for the optional insertion of the linch pins. Finally, the support is secured against longitudinal displacement in its mounting and is readjustable in its mounting with respect to the opposed support by means of eccentric pins or the like. The mounting comprising support and opposed support can be exchangeably connected as an interchangeable head to a hand- or power-actuated pushrod device.

BRIEF DESCRIPTION OF THE DRAWINGS

The inventive concept permits the most varied possible embodiments. One of these has been reproduced in the attached drawing in which.

DETAILED DESCRIPTION

Figure 1:
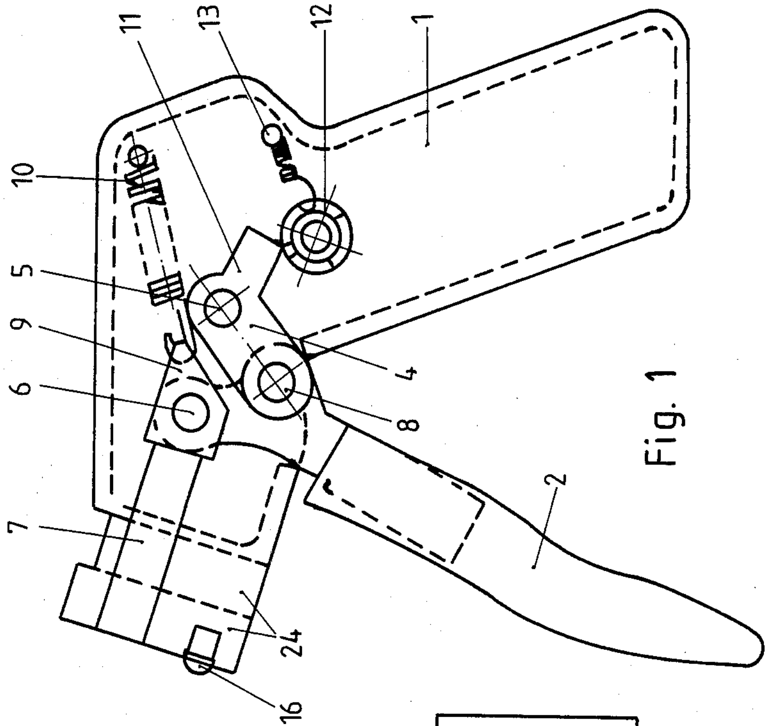
FIG. 1 shows a schematic diagram of an actuating device for the tool, fitted with a pistol grip, in the non-operative position.
Figure 2:
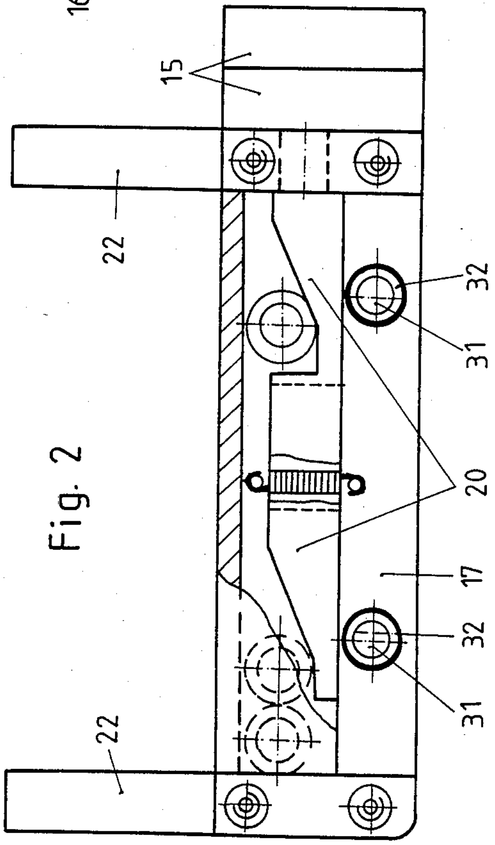
FIG. 2 shows a top view of an interchangeable head according to the invention and intended for the actuating device of FIG. 1.

Essentially, the actuating device is formed by a hollow handle 1 which is fitted with a pistol grip 2. The latter is positioned at an elbow lever drive formed of levers 3 and 4 and which, on the one hand, is supported on the hinge pin 5 and, on the other hand, on a pin 6 which is located at the end of a pushrod 7 which is guided so as to be longitudinally displaceable in the housing 1. The elbow joint pin 8 links the two lever parts 3 and 4. A tension spring 10 engaging the pushrod end 9 tends to pull the pushrod 7 back into its starting position after the pistol grip 2 has been released.

At the elbow lever part 4 a tooth segment 11 is located which works in conjunction with a mechanical latch 12, 13, known in itself, which has the effect that the pushrod 7 can return to its starting position only after one complete operating stroke.

At the front end of the housing 1, a neck 14 is located in which the pushrod 7 is guided and onto which the interchangeable heads to be used in conjunction with the actuating device can be exchangeably pushed with the aid of a guide piece 15 provided on the latter. In this arrangement, a springloaded catch 16 prevents the interchangeable head from being unintentionally pulled off.

The interchangeable head constructed in accordance with the invention and adapted to be attached to the actuating device of FIG. 1 in exchange for other types of interchangeable heads forms a chamber 18 which consists of two rigid walls 17 and which changes into the guide piece 15. On the inside of the chamber 18, a push wedge 20 provided wih two wedge faces 19 lying behind each other is guided so as to be longitudinally displaceable and rests with a stop 21 against one end of the pushrods 7 projecting into the chamber 18.

At both ends of the wall 17 forming the chamber 18, tie bars 22 constructed in the same manner are provided which, in turn, form guides for the support 23 and the opposed support 24. The support 23 advantageously cross-sectionally forms a U which is open to the bottom and between the legs of which support rollers 25 are supported by means of which the support 23 is supported on the wedge faces 19 of the push wedge 20. A tension spring anchored in the chamber 18 provides for the support 23 to be pulled into its lowermost position in which the rollers 25 rest against the wedge faces 19.

Figures 3, 7:
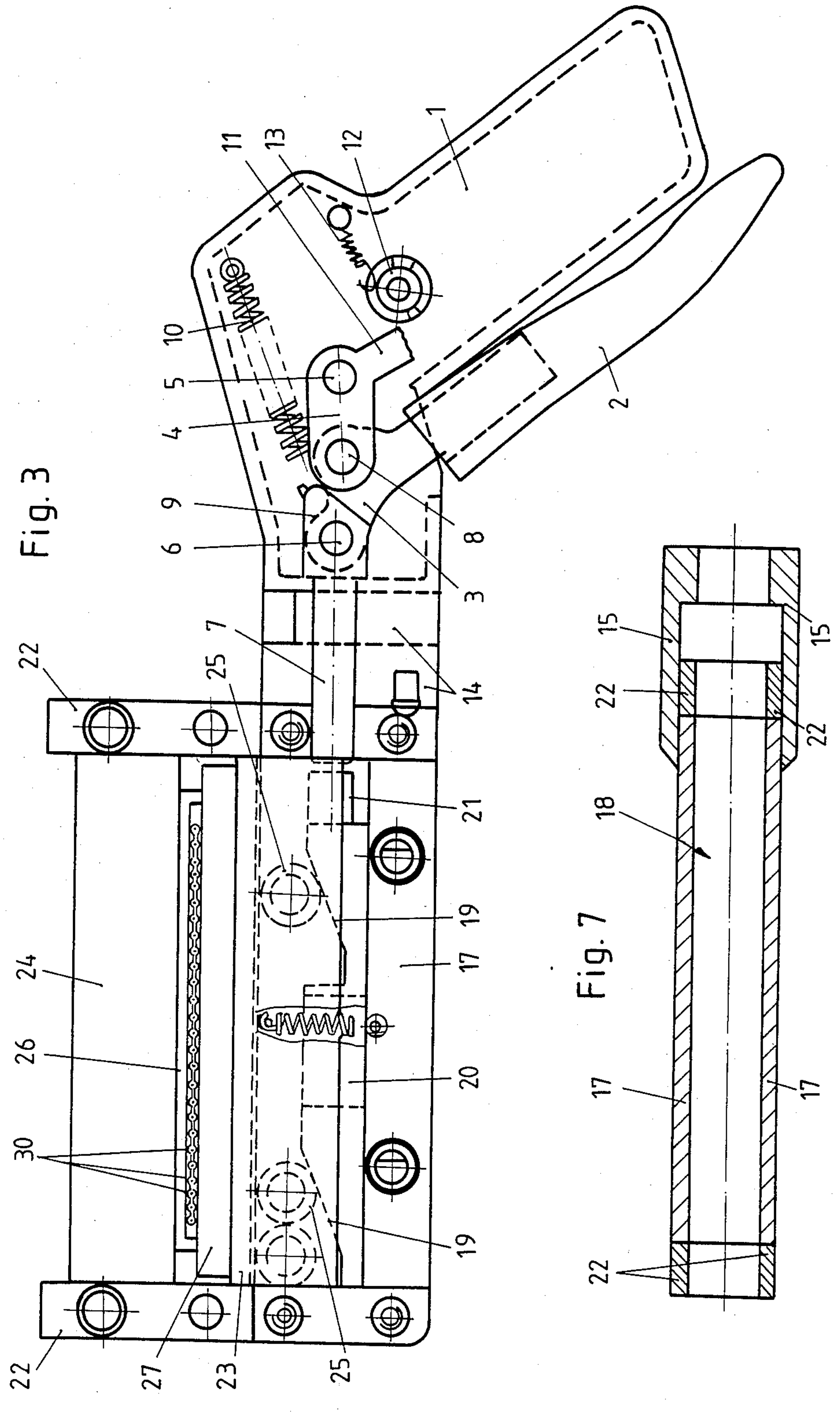
FIG. 3 shows a side view of the complete tool in operating position.
FIGS. 4, 5 and 6, 7 show top views of the interchangeable head in various operating positions.

For the connection to the ribbon cable 30, two-part binders 26, 27 (FIG. 3) are provided which are pressed together between the support 23 and opposed support 24 with interposition of the ribbon cable 30 as soon as the pushrod 7 is pushed forward into the chamber 18 when the pistol grip 2 is taken back via the elbow lever drive, and pushes the push wedge 20 forward. This pressing position is shown in FIG. 3.

The opposed support 24, also called adaptor, mounted between the tie bars 22 can be adjusted to various pressing heights in order to take account in this manner of the various binders. For this purpose, the tie bars 22 have holes 28 at various heights into which knurled pins 29 passing through the tie bars and the opposed support are to be exchangeably inserted.

Figure 5:
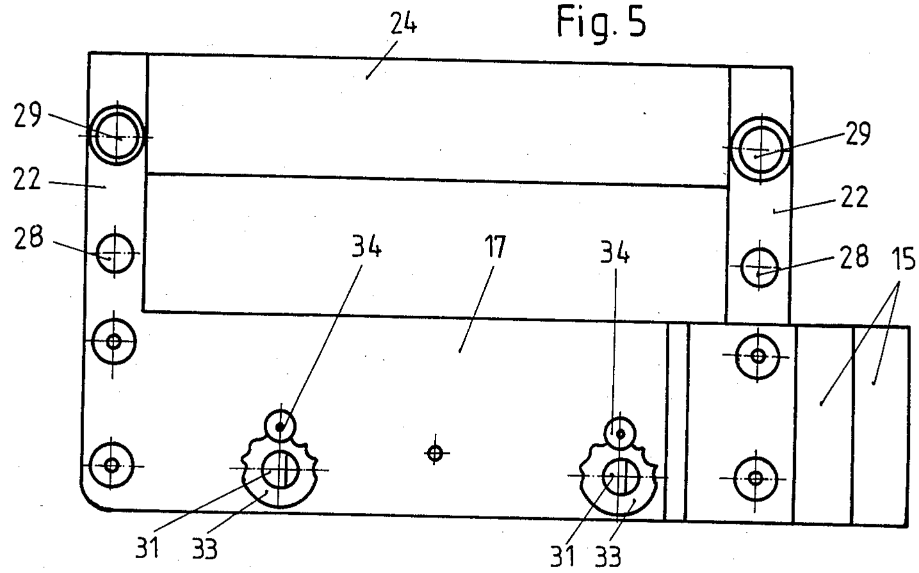
Figure 4:
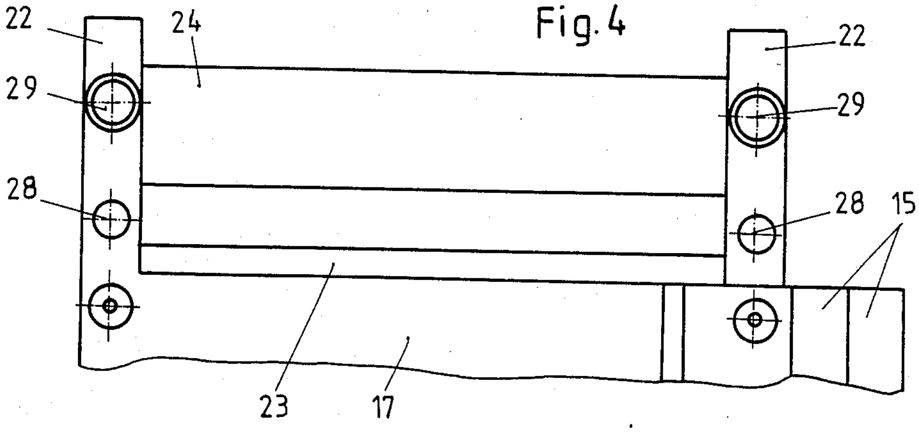
Figure 6:
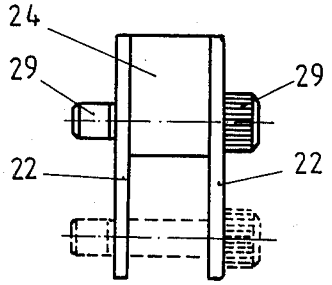

For purposes of changing and adapting the pressing height and especially for adjusting the parallelity of support and opposed support, eccentric pins 31 with rollers 32 carried thereon are provided in the lower part of the chamber 18 against which eccentric pins the push wedge 20 rests. Adjustment is carried out with the aid of adjusting knobs 33 and catches 34 (FIG. 5) by means of which the eccentric pins 31 can be adjusted.

The actuating tool 1, 2 is attached to the interchangeable head 17, 18 in the manner known in itself. Prior to that, the pressing height required by the binders used must be set at the interchangeable head. This is carried out by using the knurled pins 29 and by actuating the eccentric pins 31, 32 and adjusting devices 33, 34 for the support. The pressing pressure required for pressing together the binder parts and the interposed ribbon cable 30 is applied by means of the pistol grip 2 by means of which the push wedge 20 is displaced by the required amount.

I claim:

1. A wiring tool adapted to be mounted to an actuating device of the type having a linearly reciprocally movable pushrod for wiring multi-pin ribbon connectors, and with the wiring tool comprising a wall and an opposed support rigidly mounted together in spaced relation, a push wedge mounted for reciprocal sliding movement upon an upper surface of said wall in response to movements of the actuating device pushrod, said push wedge having two wedging faces located distally and at inclines with respect to said wall upper surface, a movable support positioned between said push wedge and said opposed support, a pair of rollers rotatably supported upon said movable support with each of said rollers being rotatably located upon a different one of said two wedging faces of said push wedge, and spring means for biasing said movable support and said rollers towards said wall, whereby a ribbon cable and multi-pin connector may be mounted between the movable and opposed supports and wired by actuation of the pushrod which moves the inclined wedge faces causing the rollers rotatably located thereon to move away from the wall and urge the movable support towards the opposed support thereby compressively wiring the ribbon cable to the multi-pin connector.

2. The wiring tool of claim 1 wherein said wall and said opposed support are rigidly mounted together with said wall upper surface parallel to a surface of said opposed support facing said wall.

3. The wiring tool of claim 1 wherein said two wedging surfaces of said push wedge are mutually parallel and wherein said rollers are of the same diameter.

* * * * *